(12) United States Patent
Sugata et al.

(10) Patent No.: US 7,156,589 B2
(45) Date of Patent: Jan. 2, 2007

(54) TOOL HOLDER OF MACHINE TOOL

(75) Inventors: Shinsuke Sugata, Fukuyama (JP); Tadashi Makayama, Onomichi (JP)

(73) Assignee: Horkos Corp, Fukuyama (JP)

( * ) Notice: Subject to any disclaimer, the term of this patent is extended or adjusted under 35 U.S.C. 154(b) by 29 days.

(21) Appl. No.: 10/520,531

(22) PCT Filed: May 12, 2003

(86) PCT No.: PCT/JP03/05911

§ 371 (c)(1),
(2), (4) Date: Jan. 7, 2005

(87) PCT Pub. No.: WO2004/009288

PCT Pub. Date: Jan. 29, 2004

(65) Prior Publication Data

US 2005/0258003 A1 Nov. 24, 2005

(30) Foreign Application Priority Data

Jul. 18, 2002 (JP) .............................. 2002-209894

(51) Int. Cl.
B23C 9/00 (2006.01)
B23Q 11/10 (2006.01)

(52) U.S. Cl. .................... 409/136; 408/59; 408/60

(58) Field of Classification Search ................ 409/136; 408/57, 59

See application file for complete search history.

(56) References Cited

U.S. PATENT DOCUMENTS 3,096,668 A * 7/1963 Maynard ................ 408/59
3,364,800 A * 1/1968 Benjamin et al. ....... 408/239 R (Continued)

FOREIGN PATENT DOCUMENTS

JP 6-206140 7/1994
JP 3064423 9/1999

OTHER PUBLICATIONS

Microfilm of the specification and drawings annexed to the request of Japanese Utility Model Application No. 61210/1987, Nov. 4, 1988.

Primary Examiner—Monica Carter
Assistant Examiner—Eric A. Gates
(74) Attorney, Agent, or Firm—Merek, Blackmon & Voorhees, LLC (57) ABSTRACT

A tool holder of a machine tool, wherein a holder rear end part is fixed to the front end part of the spindle of the machine tool, a tool receiving surface part (8d) for receiving the rear end face of a shaft-like tool (11) fixed to a holder front end part so that a closed space in contact with the rear end face can be formed and mist cutting fluid passages (8f, 9c) for leading mist cutting fluid fed from the front end part of the spindle to the closed space (12) are formed in a holder body at a center of rotation, and exhaust passages are formed for opening a part of the tool receiving surface part in contact with the closed space (12) to the atmosphere, whereby even when the shaft-like tool (11) is small in diameter and the amount of the mist cutting fluid flowing out to the atmosphere through a passage hole (11a) in the shaft-like tool is small, the liquefied cutting fluid can be prevented from being accumulated in the mist cutting fluid passages by maintaining the flow velocity of the mist cutting fluid in the mist cutting fluid passages (8f, 9c) at a proper level.

8 Claims, 11 Drawing Sheets

U.S. PATENT DOCUMENTS 5,028,178 A * 7/1991 Ronen .................. 409/136
5,649,714 A * 7/1997 Uchida et al. ............ 279/20
6,305,696 B1 * 10/2001 Sugata et al. ............ 279/20
6,602,031 B1 * 8/2003 Hara .................... 409/131

* cited by examiner

PRIOR ART

US 7,156,589 B2

TOOL HOLDER OF MACHINE TOOL

TECHNICAL FIELD

The present invention relates to a tool holder that has mist cutting fluid fed from a spindle of a machine tool spout from the tip of a shaft-like tool.

PRIOR ART

In machining with a machine tool, much cutting fluid is fed to a workpiece or a machining point to cool or lubricate a tool or to remove cutting chips. In this case, there are many problems, such as environmental pollution, ill effects to human health, high cost caused by waste oil disposal of the cutting fluid, deterioration of the life span of the tool due to supercooling the workpiece, and sliding wear of the tool due to excessive cutting fluid in minute cutting. Besides, since much cutting fluid adheres to the cutting chips in machining, the adhered cutting fluid must be separated in the disposal or recycling of the cutting chips.

In recent years, to settle the above problems, there have appeared machine tools performing so-called dry cutting that cut while feeding a very small quantity of mist cutting fluid to machining points.

Figure 11:
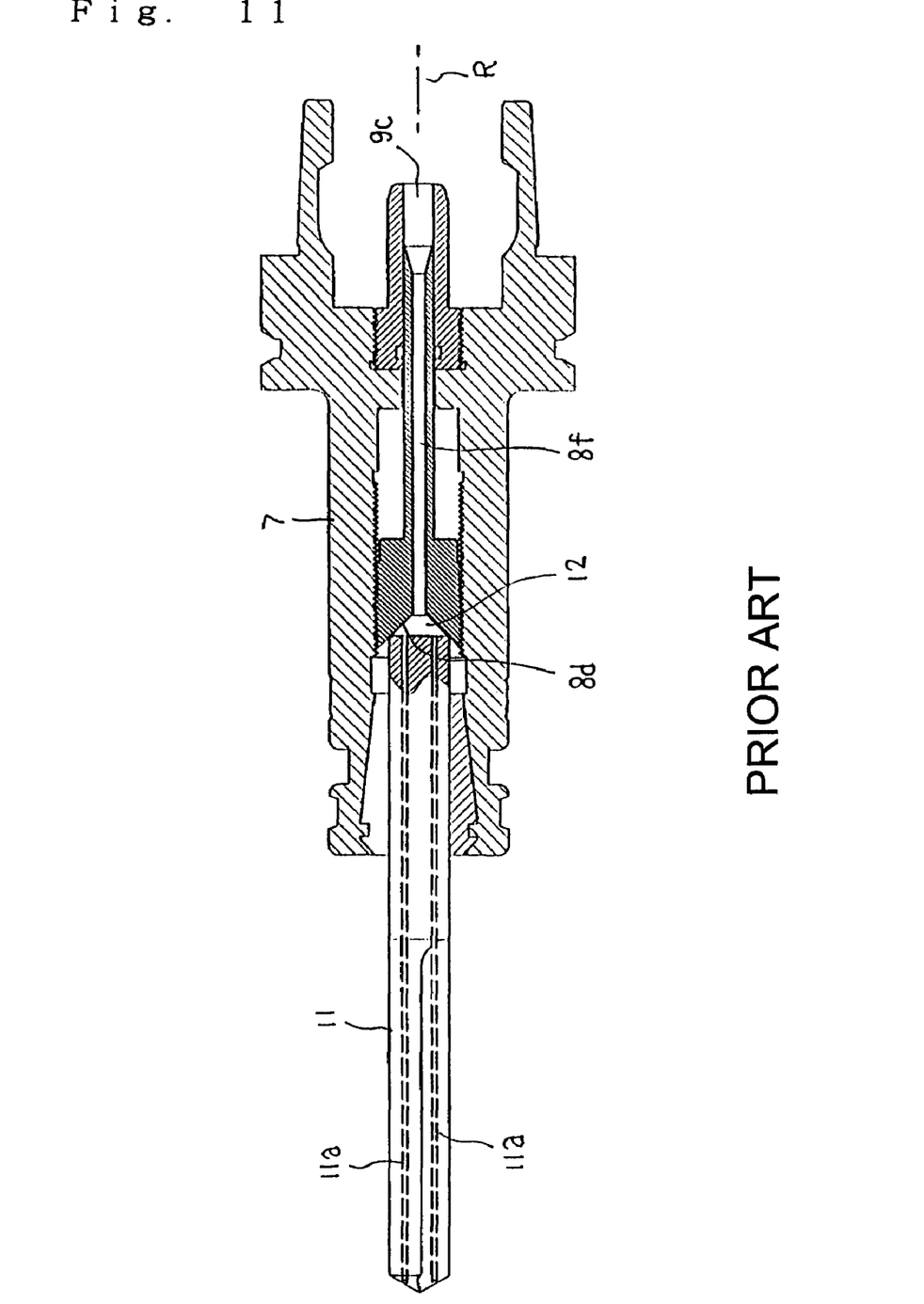
FIG. 11 is a sectional side view of a conventional tool holder.

A tool holder used in the machine tool is, for example, constructed as follows. As shown in FIG. 11, a holder rear end part is fixed on a front end of a spindle of the machine tool, and a tool receiving part 8d and mist cutting fluid passages 9c, 8f are formed at a center of rotation R in a holder body 7. The tool receiving part 8d receives the outside periphery of a rear end surface of a shaft-like tool 11 fixed on a holder front end part so as to form a closed space 12 in contact with the rear end face. The mist cutting fluid passages 9c, 8f lead the mist cutting fluid fed from the front end part of the spindle to the closed space 12.

During machining with the shaft-like tool 11, the mist cutting fluid fed from the spindle reaches the closed space 12 through the passages 9c, 8f, thereafter flowing from the front face of the shaft-like tool 11 through passage holes 11a, 11 a formed in the thickness portion thereof In the above-mentioned dry cutting, for example, although the shaft-like tool 11 having a small diameter of about 1 mm to 5 mm is used, the diameter of the passage holes 11a is about 0.1 mm to 0.5 mm, which is remarkably smaller than that of the passages 9c, 8f.

The small diameter of the passage holes 11a diminishes the amount of outflow of the cutting fluid therethrough per hour, thereby deteriorating the flow velocity of the mist cutting fluid in the passages 9c, 8f.

In this situation, when the tool holder rotates over about 6000 times per minute, mist cutting fluid to be fed into the passages 9c, 8f or the closed space 12, which is likely to stagnate, is affected by centrifugal force due to the rotation, thereby promoting liquefying. Since liquefied cutting fluid can not flow as easily as mist cutting fluid, it is gradually accumulated in circularity on wall faces of the passages 9c, 8f and comes to restrict the flow of the mist cutting fluid with progress of time. And finally, it becomes difficult to feed a sufficient quantity of mist cutting fluid to the tip of the shaft-like tool 11.

The present invention aims to solve the above-mentioned problems and to provide a tool holder of a machine tool having a required quantity of mist cutting fluid continuously flowing from the tip of a shaft-like tool.

SUMMARY OF THE INVENTION

To achieve the above-mentioned aim, a first feature of the present invention is constructed as follows. That is, a tool holder is so constructed that a tool receiving surface part for receiving a rear end face of a shaft-like tool fixed on a holder front end part so that a closed space in contact with the rear end face can be formed, mist cutting fluid passages for leading mist cutting fluid fed from a front end part of a spindle to the closed space are formed at a center of rotation of a holder body, and exhaust passages are formed for opening the closed space 12 (especially, a part of the tool receiving surface part) to the atmosphere except for the passage holes 11a of the shaft-like tool 11 in contact therewith.

According to this, even if only a little mist cutting fluid passes through the passage holes of the tool because the shaft-like tool is small in diameter, the mist cutting fluid in the closed space flows from the exhaust passages to the atmosphere with a suitable flux and the mist cutting fluid passages are decompressed. Therefore, the mist cutting fluid in the mist cutting fluid passages has the flow velocity maintained at proper levels, so as to be restricted from liquefying. Besides, even if the mist cutting fluid is liquefied, it is immediately carried into the closed space by the mist cutting fluid with a large flow velocity, thereafter flowing to the atmosphere through the passage holes of the shaft-like tool and the exhaust passages.

In this case, it is preferable that the exhaust passages have a circular portion of outer concentric portion of mist cutting fluid passages near the rotating center of the closed space open to the atmosphere. According to this, the tool holder can improve in the symmetry to the rotating center and maintain rotating stability in high-speed rotation. Besides, an effect of centrifugal force is that dense mist cutting fluid or droplets are actively led into the passage hole 11a along an inside wall of the closed space to lubricate the tip of the tool.

According to a second feature of the invention, a holder rear end part is fixed on a front-end part of a spindle of a machine tool. And besides, a tool holder is so constructed that a tool receiving surface part receives a rear end face of a shaft-like tool fixed on a holder front end part so that a closed space in contact with the rear end face can be formed, and mist cutting fluid passages for leading mist cutting fluid fed from a front end part of a spindle to the closed space are formed at a center of rotation of a holder body. Here, the tool receiving surface part is excavated rearward to form an excavated part comparatively large in diameter. On the other hand, the front end parts of the mist cutting fluid passages protrude so as to form a circular space between its peripheral part and the excavated part. Besides, exhaust passages are formed for opening a circular portion of outer concentric portion of the mist cutting fluid passages near the center of rotation of the rear end face of the excavated part to the atmosphere. In this case, it is preferable that a diameter of the excavated part 8g is about equal to the distance between the passage holes 11a in a radial direction.

According to this, in addition to the same effects as the first feature, the following effects can be gained. Since the mist cutting fluid in the front-end part of the mist cutting fluid passages flows into the closed space near the rear end face of the shaft-like tool, it is not much affected by the excavated part, which is comparatively large in diameter. Therefore, the mist cutting fluid is prevented from liquefying in the closed space, instead effectively flowing to the atmosphere through the passage holes of the shaft-like tool.

Besides, even if the liquefaction is temporarily excessive in the mist cutting fluid passages, the liquefied cutting fluid is temporarily accumulated in the excavated part. According to this, the liquefied cutting fluid can not interrupt the outflow of the mist cutting fluid through the passage holes of the shaft-like tool. In this case, the front end part of the mist cutting fluid passages can effectively restrict mixing and stirring the cutting fluid temporarily, much accumulated along the inside periphery of the excavated part with the mist cutting fluid flowing therefrom. Moreover, when the diameter of the excavated part is about equal to the distance between the passage holes 11a, 11a, the dense mist cutting fluid or the droplets near the wall of the excavated part are immediately and actively led to the passage holes 11a, 11a by the effect of centrifugal force .

The above-mentioned features can be embodied as follows.

The tool receiving surface part forms a front-end face of a tool-receiving member adjustable in a longitudinal position in the holder body. According to this, even if the longitudinal position of the shaft-like tool is changed by longitudinally displacing the tool-receiving member, the effects of the above-mentioned inventions can be gained. Here, since the tool-receiving member in the present invention is the same as that used in a conventional tool holder, different members for forming it are not especially needed.

In addition, a tool receiving member portion of the rear of the excavated part forms a double pipe structure concentric with the center of rotation thereof. The inside of an inner tube of the double pipe structure part forms a part of the mist cutting fluid passages, and a circular space between the inner tube and an outer tube thereof forms the first exhaust passage portion by opening into the excavated part. In this case, the circular space preferably reduces the diameter of the first exhaust passage 8k to the excavated part. According to this, the exhaust passage becomes superior in symmetry with respect to the center of rotation of the tool holder, thereby securing the rotational stability thereof in high speed rotation, as well as preventing dense mist cutting fluid or the droplets from flowing therein.

Furthermore, the rearward circular space is so formed as to open to the atmosphere through an inner space of a holder body portion surrounding the rear end part of the double pipe structure part, the second exhaust passage portion, and a space of a tool fixing part formed to the front end part of the holder body. Here, the second exhaust passage is formed between the tool receiving member and the holder body. Accordingly, the outside periphery of the tool is efficiently lubricated.

Besides, an automatic switching valve is provided in the exhaust passage, which opens when air pressure in the closed space is more than a fixed level. According to this, the automatic switching valve opens only when the mist cutting fluid is apt to stagnate in the mist cutting fluid passages, and the mist cutting fluid flows from the exhaust passages to the atmosphere, thereby decompressing the mist cutting fluid passages. Therefore, the mist cutting fluid therein improves in flow.

Moreover, a cylindrical valve for switching the exhaust passage and a spring for pressing the cylindrical valve forward are externally inserted and mounted on the periphery of the mist cutting fluid passages at the rearward tool receiving member portion of the double pipe structure part. When the air pressure of the closed space is more than the fixed level, the cylindrical valve is pressed and displaced rearward against an elastic force of the spring to open the exhaust passage. Conversely, when it is less than the fixed level, the cylindrical valve is pressed and displaced forward by the elastic force to close it. According to this, the cylindrical valve and the spring become superior in symmetry with respect to the center of rotation of the tool holder, thereby improving the rotational stability thereof as well as making the automatic switching valve compact.

DETAILED DESCRIPTION OF PREFERRED EMBODIMENTS OF THE INVENTION

The present invention will be explained as follows with reference to the drawings.

Figure 1:
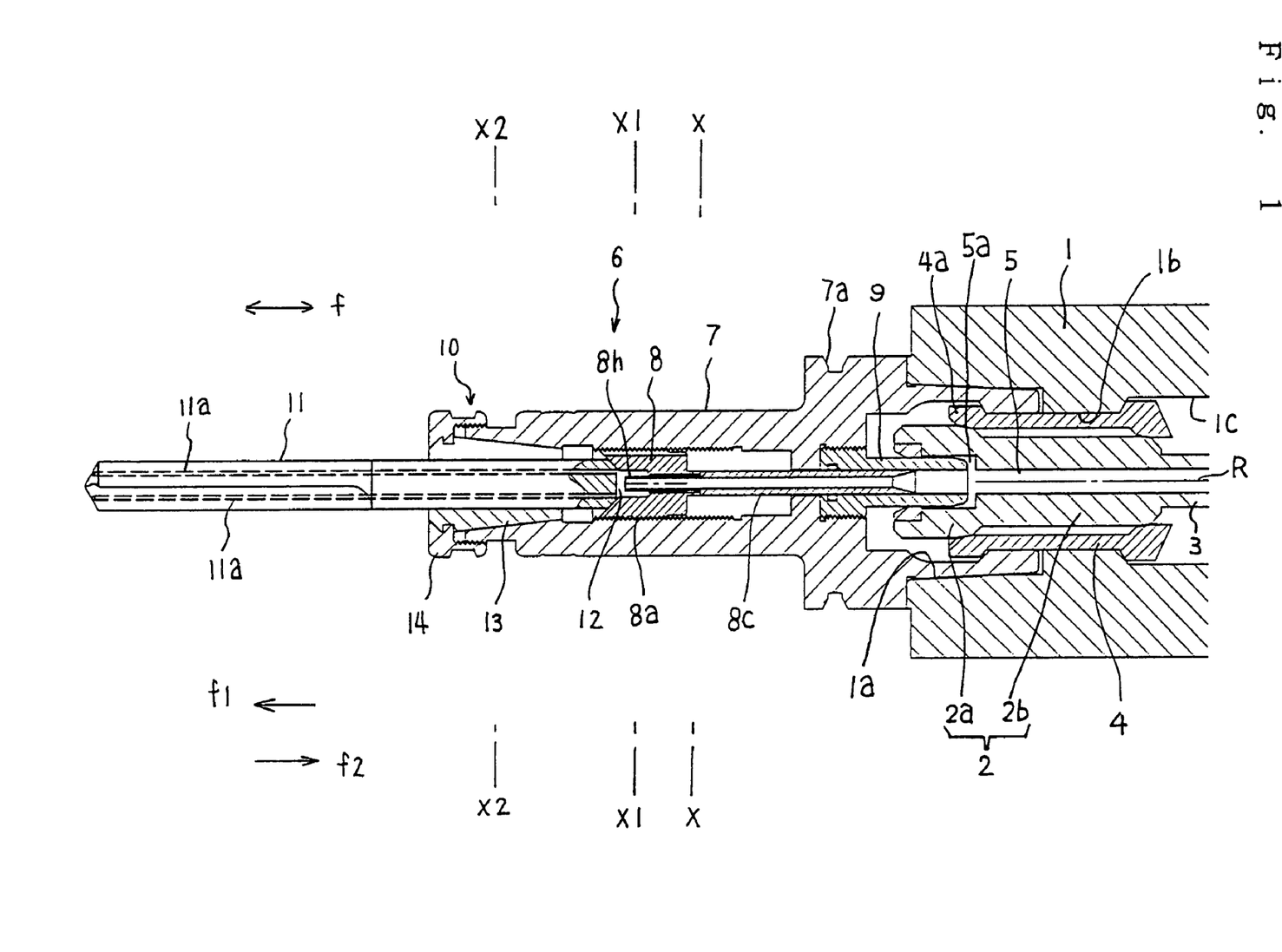
FIG. 1 is a sectional view from the side of a spindle device of a machine tool having a tool holder showing an embodiment of the present invention.
Figure 2:
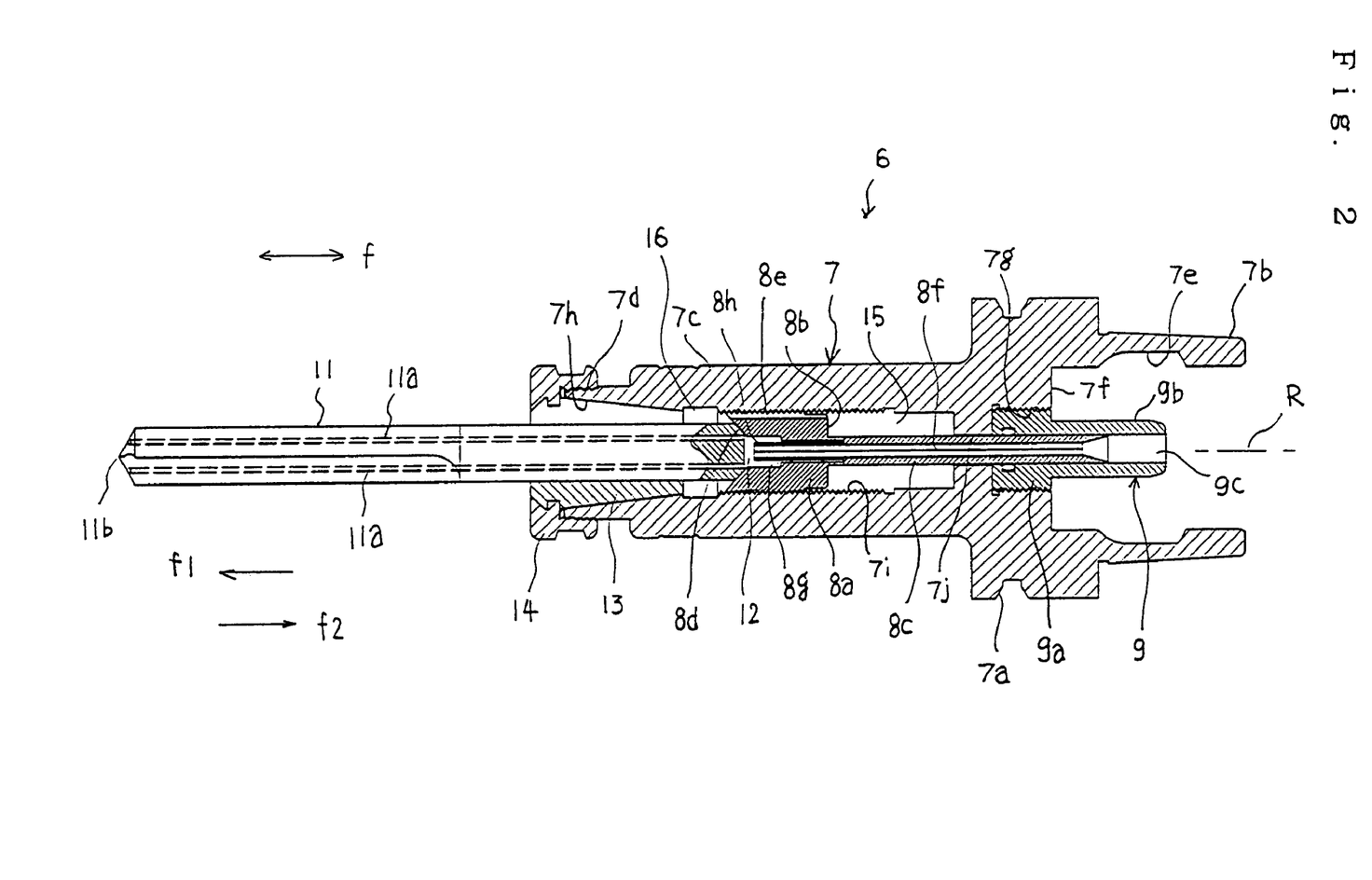
FIG. 2 is a sectional side view of the tool holder.
Figure 3:
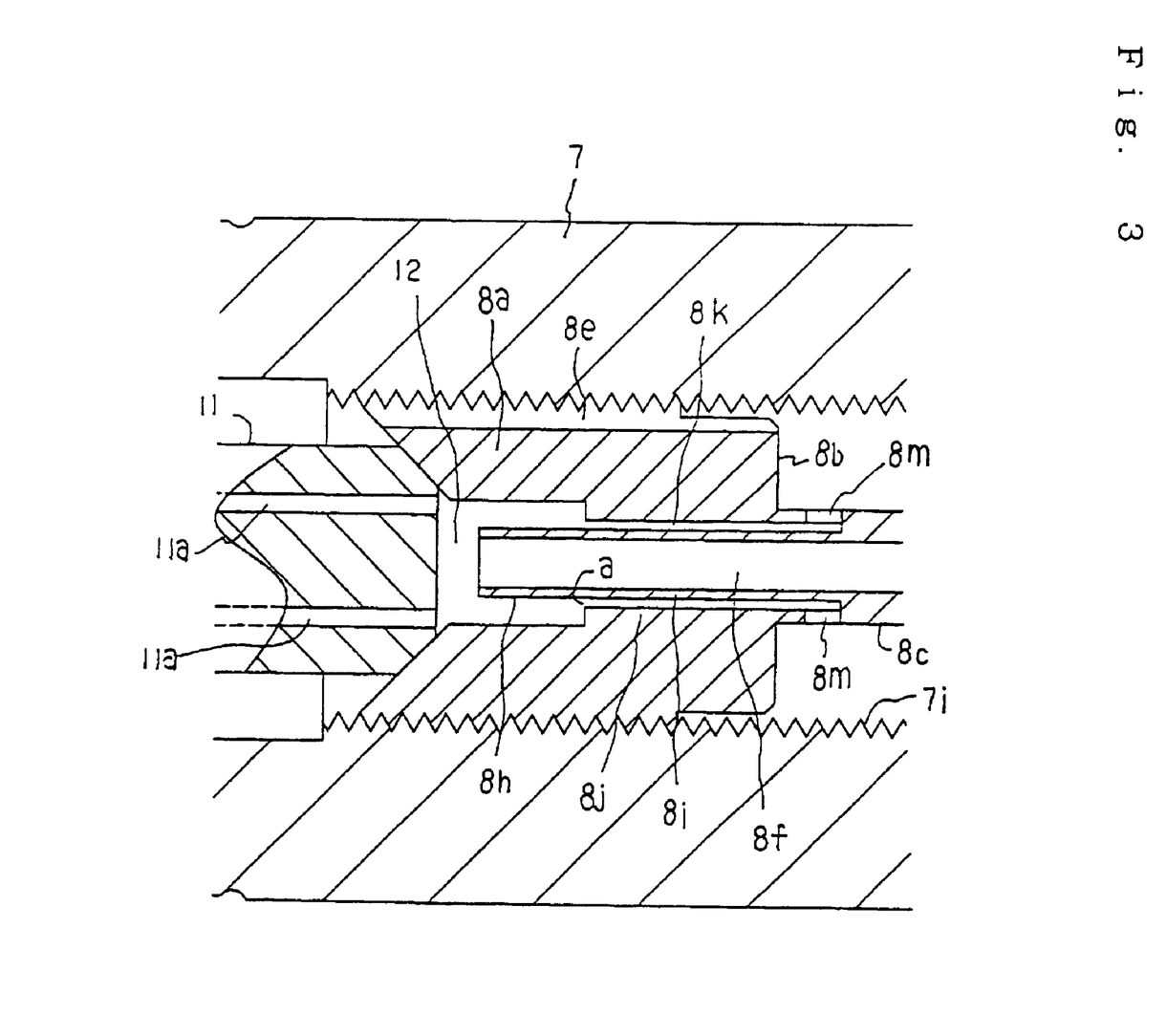
FIG. 3 is an enlarged sectional view around a tool receiving member of the tool holder.
Figure 4:
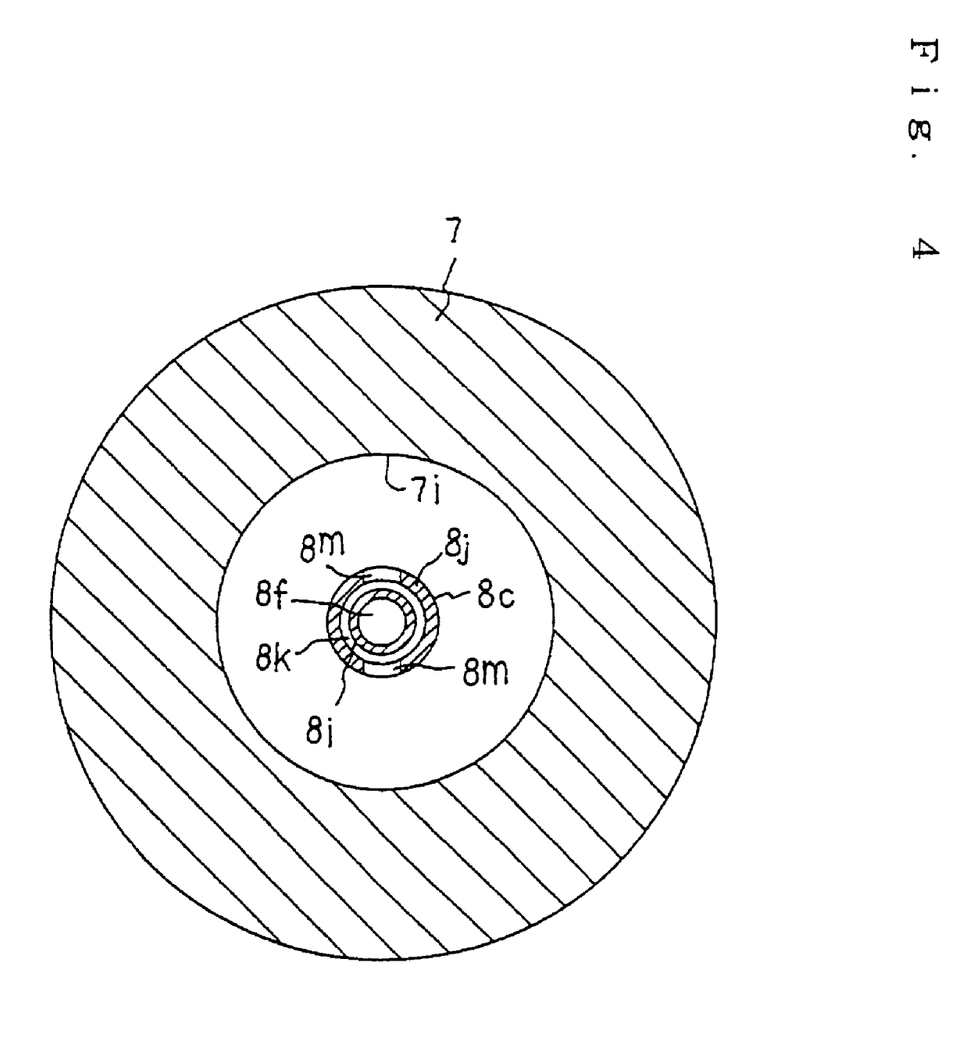
FIG. 4 is a sectional view taken on line x—x in FIG. 1.
Figure 5:
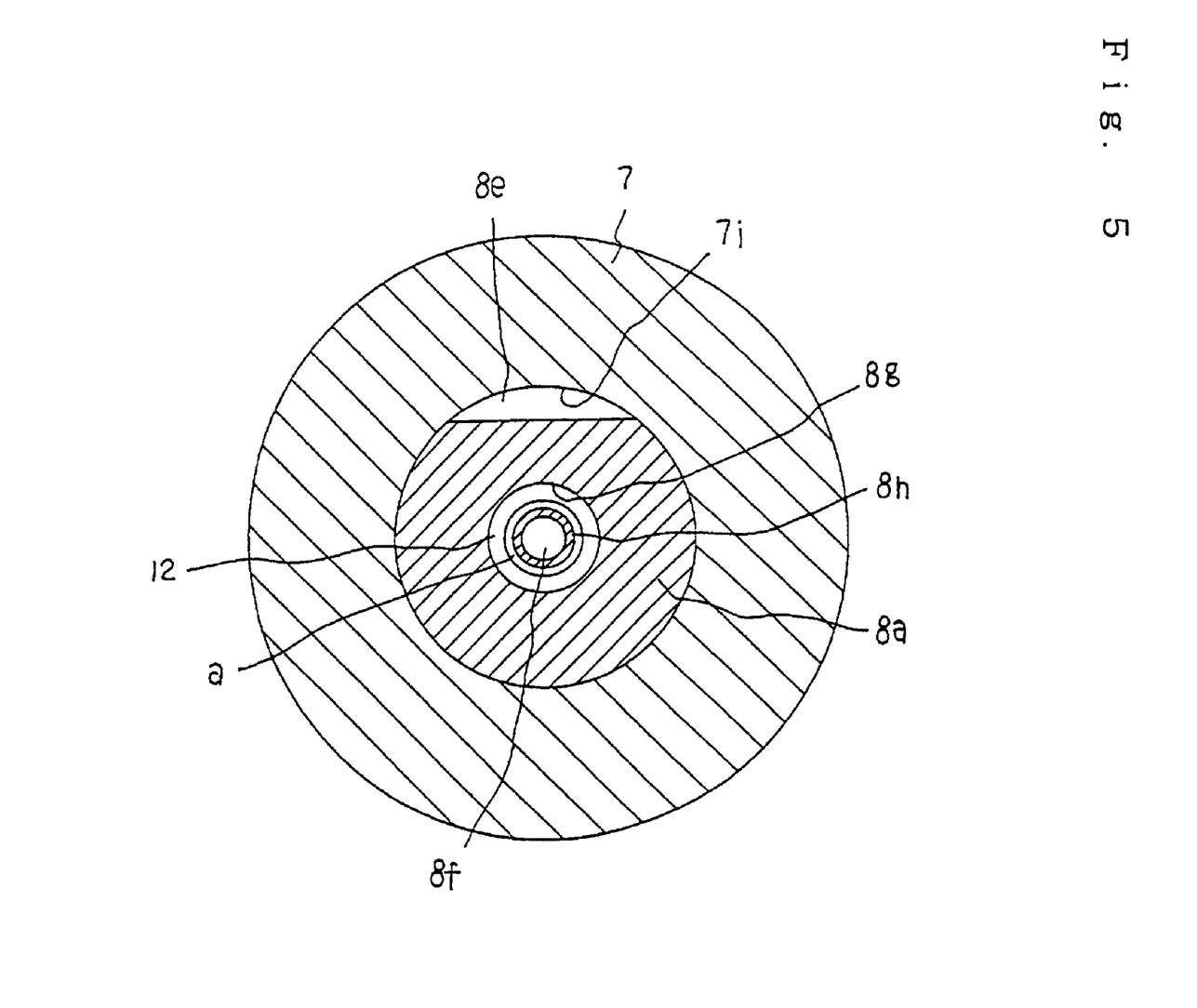
FIG. 5 is a sectional view taken on x1—x1 in FIG. 1.
Figure 6:
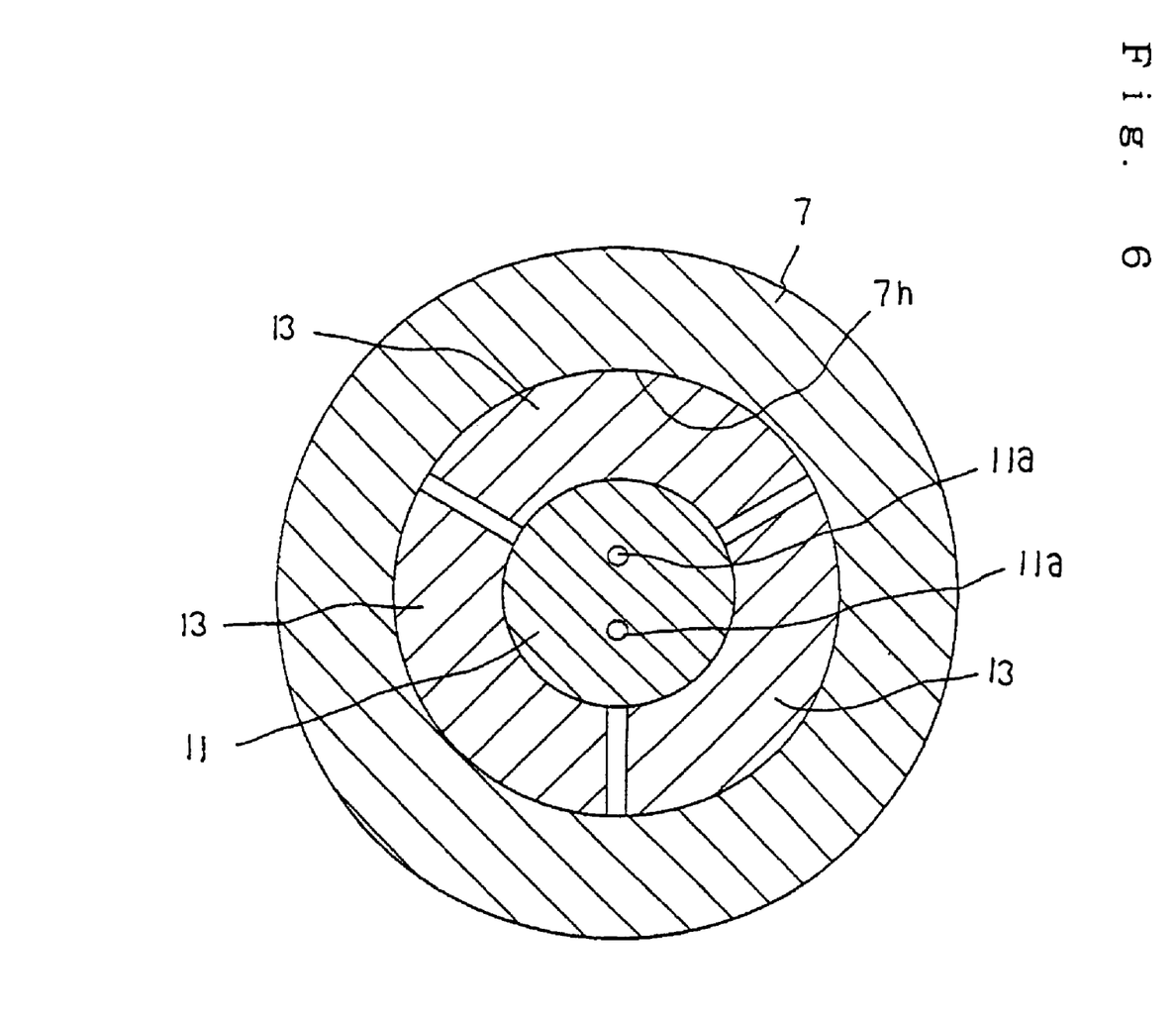
FIG. 6 is a sectional view taken on x2—x2 in FIG. 1.

FIG. 1 is a sectional side view of a spindle device of a machine tool having a tool holder showing an embodiment of the present invention, and FIG. 2 is a sectional side view of the tool holder. FIG. 3 is an enlarged sectional view around a tool receiving member of the tool holder. FIG. 4 is a sectional view taken on line x—x in FIG. 1, FIG. 5 is a sectional view taken on x1—x1 in FIG. 1, and FIG. 6 is a sectional view taken on X2—x2 in FIG. 1.

In these figures, 1 is a spindle of a machine tool, which has a taper hole 1a and coaxial large and small holes 1b, 1c at a center of rotation R thereof. A cylindrical clamp part 2 comprising a large-diameter part 2a and a small-diameter part 2b and a draw bar part 3 for longitudinally displacing the cylindrical clamp part 2 are inserted in the centers of the holes 1a, 1b, 1c. In addition, a plurality of spindle-side collets 4 is circularly engaged between the cylindrical clamp part 2 and the spindle 1.

In this case, a straight mist cutting fluid passage 5 is formed at the centers of the cylindrical clamp part 2 and the draw bar part 3, transferring mist cutting fluid generated outside or inside the spindle 1 to a front f1 of the spindle 1.

The cylindrical clamp part 2 moves in a longitudinal direction f with the draw bar 3. The draw bar is comparatively small in diameter. In this case, when the draw bar 3 is displaced in the front direction f1, the large-diameter part 2a goes through the spindle-side collets 4 group in the front direction f1, and the rear end part of the small-diameter part 2b moves forward of the rear end of each spindle-side collet 4 on the periphery thereof Accordingly, the circular spindle-side collets 4 group is freely displaced in a radial direction. Conversely, when the draw bar 3 is displaced in a rear direction f2, the large-diameter part 2a is moved from outside of the spindle-side collets 4 group in the rear direction f2 to interfit with the group of spindle-side collets, and the rear end part of the small-diameter part 2b is moved into the rear end of each spindle-side collet 4 to interfit therewith. Accordingly, the diameter of the spindle-side collets 4 group is enlarged to the maximum to be fixed in place.

Numeral 6 is a tool holder 6 of the present invention, fixed on the spindle 1 concentrically with the center of rotation R thereof. The tool holder 6 is provided with a holder body 7, a tool receiving member 8, a protuberant connecting member 9 and a tool fixing part 10.

The holder body 7 is symmetric with the center of rotation R, comprising a gripped part 7a, a cylindrical tapered shaft part 7b, a straight part 7c, an external thread part 7d, a circular concavity 7e, a radial surface part 7f, an internal thread 7g, a tapered hole 7h, a thread hole 7i and a small-diameter hole 7j, as shown in FIG. 2. The gripped part 7a is large in diameter. The cylindrical tapered shaft part 7b is provided to the rear f2 of the gripped part 7a, and the straight part 7c is provided to the front f1 thereof. The external thread part 7d is formed to the front of the straight part 7c. The circular concavity 7e is formed on the inside periphery of the tapered shaft part 7b, and the radial surface part 7f is formed on the forefront end thereof. The internal thread 7g is formed at the center of the radial surface part 7f. The tapered hole 7h is formed at the front f1 of the inside of the straight part 7c, and the thread hole 7i is formed to the rear f2 thereof so as to communicate with the tapered hole 7h. Besides, the small-diameter hole 7j is formed at the center of the gripped part 7a for communicating the internal thread 7g with the thread hole 7i.

The tool receiving member 8, which is screwed into the thread hole 7i displaceably in the longitudinal direction f, comprises an external thread part 8a and a slender passage part 8c. The slender passage part 8c extends from the rear end face 8b of the external thread part 8a in the rear direction f2 to be inserted into the small-diameter hole 7j. The front end face of the external thread part 8a forms a tapered tool receiving surface part 8d for receiving the outside periphery of the rear end face of a shaft-like tool 11 such as a drill so as to form a closed space 12 contacting the rear end face. In addition, a second exhaust passage 8e is provided between the external thread part 8a and the thread hole 7i by forming a longitudinal grooved passage on a peripheral thread surface of the external thread part 8a. Moreover, a straight mist cutting fluid passage 8f comparatively small in diameter is formed att the center of rotation R of the external thread part 8a and the slender passage part 8c.

A circular hole-like excavated part 8g is formed at the center of the tool receiving surface part 8d of the external thread part 8a, extending in the rear direction f2, the excavated part having a larger diameter than the forward mist cutting fluid passage 8f. The front end part 8h of the forward mist cutting fluid passage 8f protrudes from the rear end face of the excavated part 8g in the front direction f1, and a forward opening thereof is located as close as possible to the rear end face of the shaft-like tool 11.

The rear of the excavated part 8g of a part of the external thread part 8a forms a double pipe structure part as shown in FIG. 3. The inside of an inner pipe part 8i forms a part of the forward mist cutting fluid passage 8f. A circular space 8k between an outer pipe part 8j and the inner pipe part 8i forms the first exhaust passage portion, having a front end opening in the excavated part 8g and a rear end communicating with radial holes 8m, 8m formed in the thickness of the front end face of the slender passage part 8c. In this case, the front end of the first exhaust passage portion 8k is located near the center of rotation of the rear end face of the excavated part 8g, making a circular portion concentric with the center of rotation R and opening 'a'.

The protuberant communicating member 9, as shown in FIG. 2, comprises a comparatively short external thread part 9a and a straight protruding part 9b. The external thread part 9a is screwed to the internal thread part 7g in order to be integrally fixed on the holder body 7. The straight protruding part 9b is so constructed that a straight rearward mist cutting fluid passage 9c for extending the forward mist cutting fluid passage 8f in the rear direction f2 is provided at the center of rotation R, and that the periphery of the rear end part is inserted into the forward-enlarged part 5a of the mist cutting fluid feeding passage 5. In this case, the slender passage part 8c is inserted into the front of the rearward mist cutting fluid passage 9c, and the forward mist cutting fluid passage 8f and the rearward mist cutting fluid passage 9c in the slender passage part 8c are airtightly communicated through a sealing member. Besides, the straight protruding part 9b and the forward-enlarged part 5a are airtightly communicated through a sealing member fixed thereon.

The tool fixing part 10 comprises three tool collets 13 and a fastening nut body 14. The tool collets 13 are circularly interfitted into the tapered hole 7h. The fastening nut body 14 is externally screwed on the external thread part 7d to displace the circular tool side collets 13 group in the longitudinal direction f. In this case, when the fastening nut body 14 is turned in a closing direction around the center of rotation R, it presses the tool side collets 13 group in the rear direction f2 to reduce the diameter due to interaction with the tapered hole 7h. Conversely, when it is turned in the opposite direction, it pulls the tool side collets 13 group in the front direction f1 to expand the diameter.

The base part of the shaft-like tool 11 is inserted into the central hole of the tool side collets 13 group. In this case, by turning the fastening nut body 14 in the above-mentioned closing direction, the base part of the shaft-like tool 11 is fastened to the tool side collets 13 group in order to be integrally fixed on the holder body 7 by being drawn in the rear direction f2. Besides, the periphery of the rear end face of the shaft-like tool 11 is airtightly pressed on the tool receiving surface part 8d. Conversely, according to rotating it in the opposite direction, the tool side collets 13 group is displaced so as to expand the diameter to enable the base of the shaft-like tool 11 to be pulled out of the central hole.

The shaft-like tool 11 is provided with passage holes 11a, 11a for passing cutting fluid in a longitudinal direction through one or a plurality of portions (in figures, two portions) of the thickness. A cutting part of the shaft-like tool like can have various sizes in diameter, occasionally 1 mm to 5 mm. The diameter of the passage hole 11a of a cutting part having a small diameter like this is, for example, about 0.1 mm to 0.5 mm. These passage holes 11a, 11a have inlet openings and outlet openings on the rear end face and on the front end face of the shaft-like tool 11, respectively. In this case, two inlet openings are located in the closed space 12.

In the above-mentioned structure, the forward mist cutting fluid passage 8f and the rearward cutting fluid passage 9c serve as a mist cutting fluid passage of the tool holder 6. Besides, the first exhaust passage portion 8k, two radial holes 8m, 8m, an internal space 15 of the holder body 7 surrounding the peripheral rear part of the double pipe structure part of the external thread part 8a, the second exhaust passage portion 8e, an internal space 16 of the holder body 7 surrounding the front of the external thread part 8a, and a space between the tool side collets 13, etc.

serve as an exhaust passage for opening a part of the tool receiving surface part 8d abutted on the closed space 12 to the atmosphere.

An explanation about the operation of each part, using an example of the above-mentioned device, is as follows.

When fixing the tool holder 6 on the spindle 1, at first, the draw bar part 3 is displaced in the rear direction f2 to displace the cylindrical clamp part 2 thereto, and therefore, the spindle side collets 4 group in circular arrangement is freely displaced to reduce diameter.

In this situation, the tapered shaft part 7b of the tool holder 6 is pushed into the tapered hole 1a of the spindle 1 with the gripped part 7a gripped. Hence, the tapered shaft part 7b is deeply inserted into the tapered hole 1a by reducing the diameter of the spindle side collets 4 group at the inside periphery thereof The forefront large diameter part 4a of the spindle side collets 4 group is located in the circular concave part 7e of the inside periphery of the tapered shaft part 7b. Besides, the rear end part of the protuberant communicating member 9 is interfitted into the forefront enlarged part 5a to airtightly communicate the mist cutting fluid feeding passage 5 with the rearward mist cutting fluid passage 9c.

Thereafter, the draw bar 3 is pulled in the rear direction f2 to enlarge the diameter of the spindle side collets 4 group. Here, the forefront large diameter part 4a is engaged with the circular convex part 7e. Then, the tapered shaft part 7b is pulled to the rear direction f2 to be exactly-concentrically fixed on the specified position of the spindle 1 as shown in FIG. 1.

Besides, when the fixed tool holder 6 is detached from the spindle 1, the steps for fixedly attaching it thereon are performed in reverse order.

When machining a work, first of all, the spindle 1 is rotated, and the mist cutting fluid is fed into the mist cutting fluid feeding passage 5 of the spindle 1 from the rear thereof. In this case, the rotation of the spindle 1 is transmitted to the tool holder 6 by friction force caused between the tapered hole 1a and the tapered shaft part 7b to rotate the tool holder 6 concentrically therewith. Here, the mist cutting fluid may be generated outside the spindle 1 or thereinside. The mist cutting fluid inside the mist cutting fluid feeding passage 5 reaches the forward mist cutting fluid passage 8f through the rearward cutting fluid passage 9c, and then, the inside of the closed space 12 covering the rear end face of the shaft-like tool 11, continuously. Thereafter, it spouts from the outlet opening of the front end face of the shaft-like tool 11 through the passage holes 11a, 11a, and besides, flows to the atmosphere in front of the tool fixing part 10 through the exhaust passage comprising the first exhaust passage portion 8k, the internal space 15 of the thread hole part 7i on the rear of the external thread part 8a, the second exhaust passage part 8e, and each space among three tool side collets 13 of the tool fixing part 10.

Next, the spindle 1 is displaced toward the workpiece to cut it on the front end of the shaft-like tool 11. During this cutting process, the mist cutting fluid flowing out of the front end of the shaft-like tool 11 lubricates the portion of the workpiece being cut.

During such machining, when the spindle 1 rotates more than 6000 times per minute and the passage hole 11a is small, as in a small-diameter tool, the mist cutting fluid in a passage group comprising the mist cutting fluid feeding passage 5, the rearward mist cutting fluid passage 9c, the forward mist cutting fluid passage 8f and the closed space 12 receive strong centrifugal force due to the rotation of the tool holder 6, and liquefaction is promoted. In this case, when the mist cutting fluid does not flow out of the exhaust passages to the atmosphere, the flow velocity thereof in the passage group is excessively slow because of the small flow quantity flowing out of the passage holes 11a, 11a. Therefore, the liquefaction of the mist cutting fluid is greatly promoted. The liquefied cutting fluid stagnates in the passage group so as to gradually accumulate, and consequently, a comparatively long time is needed for reaching the tip of the tool.

Figure 7:
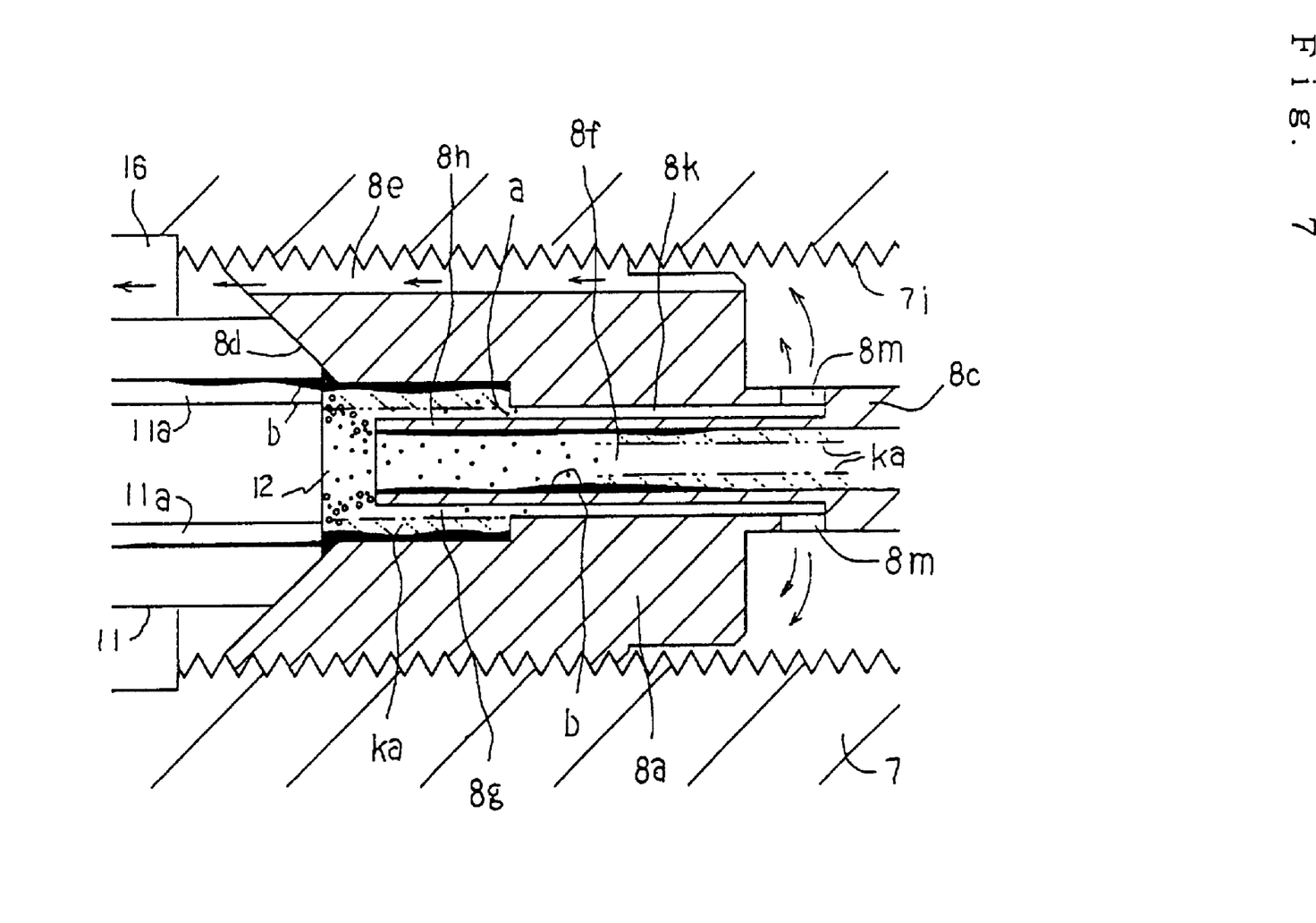
FIG. 7 is an explanatory view showing a proper flow situation of cutting fluid in the tool holder.

However, in fact, since the mist cutting fluid reaching the closed space 12 flows out of the exhaust passages to the atmosphere in an adequate flow quantity, the flow velocity thereof in the passage group is increased, and consequently, a self-stirring function is increased. Therefore, the liquefaction of the mist cutting fluid can be restricted. Besides, even if the mist cutting fluid is partially liquefied, the liquefied cutting fluid can make the mist cutting fluid flow into the closed space 12 rapidly in a large flow velocity. In this case, the high density and low density mist cutting fluids smoothly flow into the passage hole 11a and into the exhaust passages, respectively. Therefore, even if machining time is prolonged, an excess of liquefied cutting fluid is not accumulated on the inner wall surfaces of the mist cutting fluid passages 9c, 8f in circularity, as happened previously . Accordingly, the flow quantity of mist cutting fluid flowing out through the passage holes 11a, 11a during the work machining is enough to lubricate the work cutting portion of the shaft-like tool 11. FIG. 7 shows a proper flow situation of the cutting fluid like this. As shown in this figure, the liquefied cutting fluid 'b' barely accumulates only near the inlet opening of the passage hole 11a in circularity beside the insides of the front end part 8h and the closed space 12. The accumulated cutting fluid 'b' never grows, even if the time is prolonged.

In the above-mentioned flow of the mist cutting fluid, the forefront of the front end part 8h is located near the rear end face of the shaft-like tool 11. Therefore, the mist cutting fluid flowing out the front end part 8h passes through the excavated part 8g with a radius of the same length as the distance from the center of the passage hole 11a, and the high density mist cutting fluid in it flows into the passage holes 11a, 11a by centrifugal force.

During the machining operation, when excessive liquefaction temporarily occurs in the mist cutting fluid passages 5, 9c, 8f because either the tool holder 6 greatly increases in rotation velocity or the passage holes 11a, 11a are somewhat closed by cutting chips, etc., the liquefied cutting fluid is rapidly fed therefrom to the excavated part 8g by the mist cutting fluid at a large flow velocity. Then, it is temporarily accumulated therein, and thereafter flows to the atmosphere through the passage 11a. Accordingly, the mist cutting fluid in the mist cutting fluid passages 5, 9c, 8f can flow stably.

Besides, since there exists an opening 'a' in the first exhaust passage portion 8k on the circular portion around the center of rotation R of the rear end face of the excavated part 8g, a gas component separated from the mist cutting fluid by centrifugal force flows therefrom. On the other hand, a liquid component remains on the inside periphery of the excavated part 8g in circularity, and it flows out of the passage hole 11a when the remaining quantity increases.

Since the front end part 8h protrudes from the rear end face of the excavated part 8g in the front direction f1, interference between the forward flow flowing out of the front end part 8h and the rearward flow going for the first exhaust passage portion 8k in the excavated part 8g is restricted. Therefore, the mist cutting fluid can flow effectively in the closed space 12.

Figure 8:
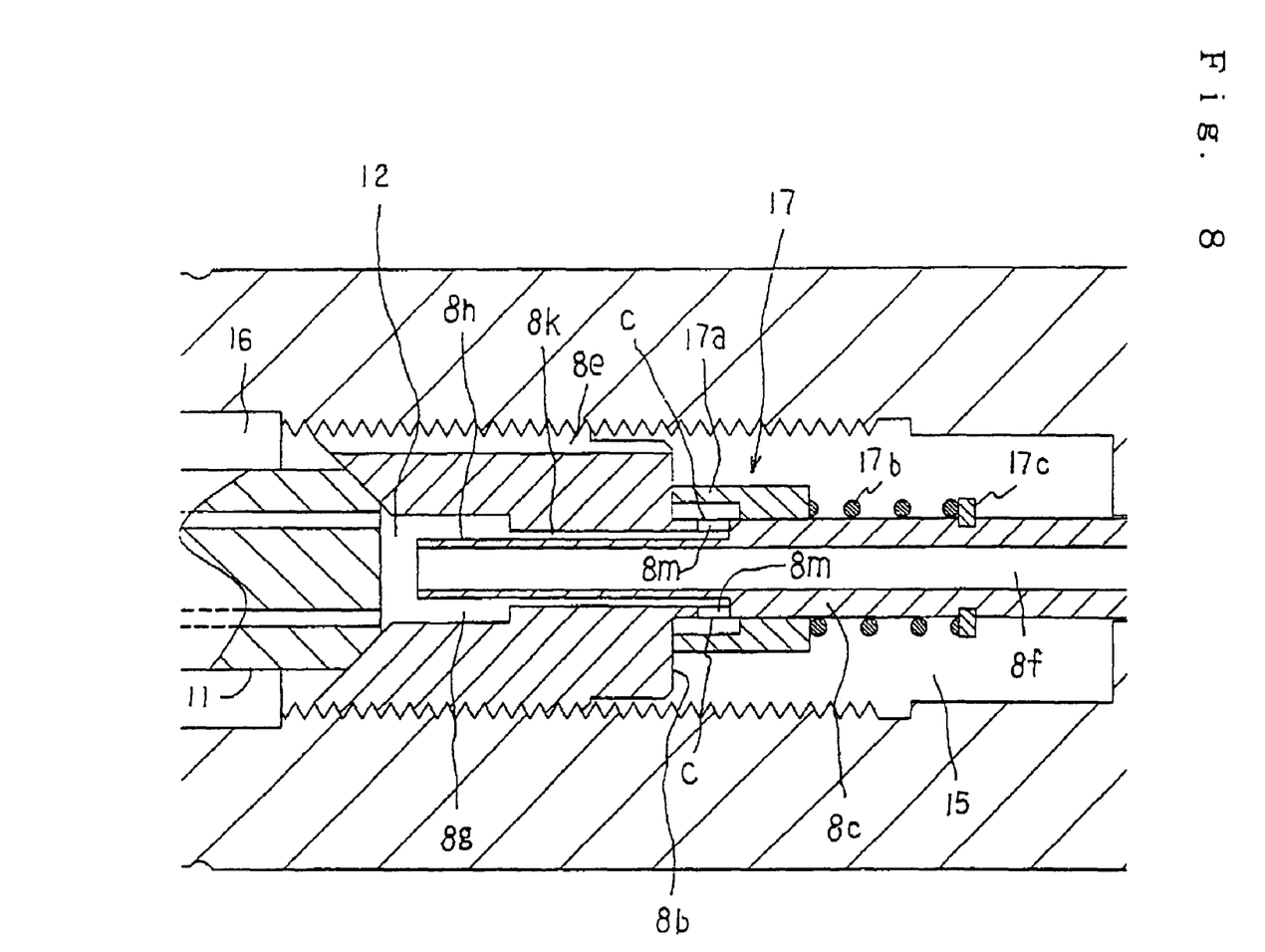
FIG. 8 is an explanatory view showing an operational condition of a first variation of the embodiment of FIG. 1.
Figure 9:
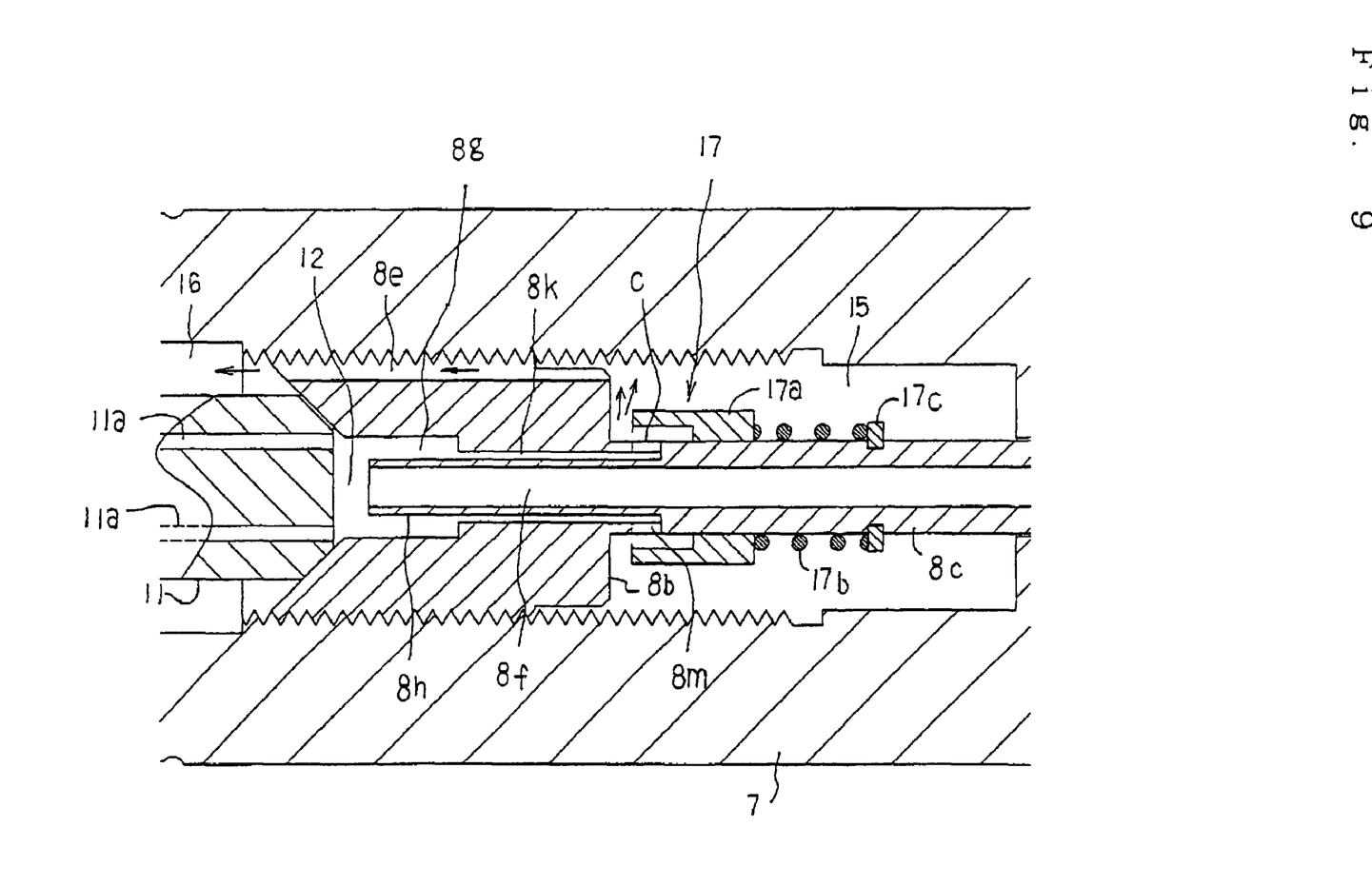
FIG. 9 is an explanatory view showing another operational condition of the first variation.

A first variation of the above-mentioned embodiment will be explained as follows. FIG. 8 is an explanatory view of working situation thereof, and FIG. 9 is an explanation view of another variation.

An automatically switching valve 17 is provided in the exhaust passage. The switching valve 17 comprises a cylindrical valve body 17a, a coil-like spring 17b and an engaging ring 17c. The cylindrical valve body 17a covers the outlet openings 'c' of the radial holes 8m, 8m, being externally inserted on the outside periphery of the slender passage part 8c airtightly and slidably in the longitudinal direction through a not-illustrated packing. Here, the outside periphery of the slender passage part 8c serves as the peripheral wall part of the forward mist cutting fluid passage 8f. The coil-like spring 17b is to press the cylindrical valve body 17a in the front direction f1, being externally inserted on the outside periphery of the slender passage part 8c and compressed by the engaging ring 17c. In this case, the front end face of the cylindrical valve body 17a is formed so as to airtightly engage the rear end face 8b of the external thread part 8a.

The varied embodiment is operated as follows. When the mist cutting fluid in the closed space 12 flows to the atmosphere through the passage holes 11a, 11a in a quantity above a fixed flow quantity, the air pressure in the forward mist cutting fluid passage 8f is comparatively low. The flow velocity of the mist cutting fluid flowing in the passage 8f is made at a speed that does not excessively accumulate liquefied cutting fluid in the mist cutting fluid passages 5, 9c, 8f. Therefore, the mist cutting fluid need not flow from the exhaust passages 8k, 8m, 8e. However, in this situation, as shown in FIG. 8, the front end face of the cylindrical valve body 17a is displaced in the front direction f1 by the spring 17b, airtightly engaging the rear end face 8b of the external thread part 8a. Consequently, the cylindrical valve body 17a block the radial holes 8m, 8m. According to this, the mist cutting fluid is prevented from flowing to the atmosphere needlessly.

On the other hand, when the mist cutting fluid in the closed space 12 flows to the atmosphere through the passage holes 11a, 11a in a quantity below the fixed flow quantity, the pressure in the forward mist cutting fluid passage 8f or the closed space 12 is comparatively high . The flow velocity of the mist cutting fluid flowing in the passage 8f is decreased enough to excessively accumulate the liquefied cutting fluid in the mist cutting fluid passages 5, 9c, 8f. Therefore, the mist cutting fluid needs to flow out of the exhaust passages 8k, 8e. However, in this situation, as shown in FIG. 9, the cylindrical valve body 17a is displaced in the rear direction f2 against the spring 17b by air pressure acting on the inside face thereof to be separated from the rear end face 8b by a distance corresponding to the air pressure . Therefore, the radial holes 8m, 8m are communicated to the atmosphere with proper passage cross-section. According to this, the mist cutting fluid adequately flows to the atmosphere, thereby preventing the liquefied cutting fluid from excessively accumulating in the mist cutting fluid passages 5, 9c, 8f.

Figure 10:
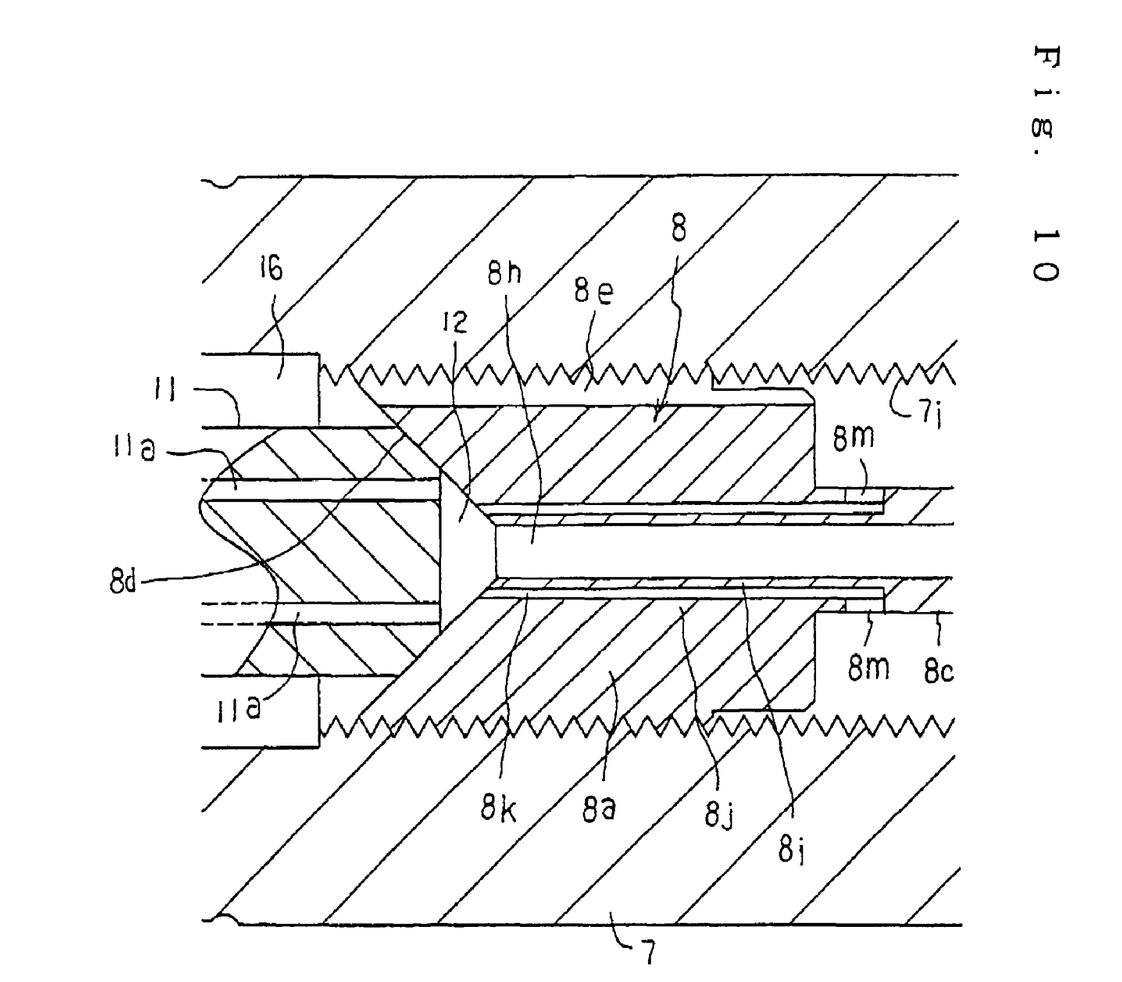
FIG. 10 is a sectional side view showing a second variation.

Next, the second variation of the above-mentioned embodiment will be explained. FIG. 10 is a sectional side view showing the variation. As shown in this figure, the excavated part 8g is not formed in the tool receiving surface part 8d, and the double pipe structure part is formed near the center of rotation of the external thread part 8a similar to the above example. That is, the inside of the inner tube part 8i forms the forward mist cutting fluid passage 8f, and the circular space between the inner tube part 8i and the outer tube part 8j forms the first exhaust passage 8k. Accordingly, there are two differences from the above example, namely, special effects due to the excavated part 8g and the front end part 8h of the forward mist cutting fluid passage 8f are not obtained, because the closed space 12 is narrow due to the absence of the excavated part 8g and the front end part 8h does not protrude in the front direction f1 in the closed space 12. However, there is an effect based on the outflow of a part of the mist cutting fluid in the closed space 12 from the exhaust passages 8k, 8e to the atmosphere similar to the above example.

In this case, instead of the circular first exhaust passage 8k, a non-circular longitudinal hole 8k, such as a drill hole, may be formed in the thickness of the external thread part 8a outside the forward mist cutting fluid passage 8f.

To simplify the structure, it can be so constructed that the mist cutting fluid in the closed space 12 is discharged through the radial holes of the holder body 7 and the external thread part 8a. This construction is also within the range of the present invention.

INDUSTRIAL APPLICABILITY

According to the present invention, the following effects will be gained.

That is, even if the cutting fluid accumulates because the shaft-like tool 11 is small in diameter and little mist cutting fluid flows to the atmosphere through the passage hole 11a and the flow in the passage is poor, the cutting fluid is rapidly transferred by keeping the flow velocity of the mist cutting fluid in the mist cutting fluid passages 5, 9c, 8k at a proper level without changing the shaft-like tool 11. A required quantity of mist cutting fluid can continuously and stably flow from the front end of the passage hole 11a.

Besides, the symmetry to the center of rotation can be easily maintained, and the rotating stability is made superior even in high-speed rotation. The high density mist cutting fluid flows to the tip of the tool through the passage hole 11a, and the low density mist cutting fluid goes around to flow to the atmosphere.

In addition to the above-mentioned effects, the following effects can be gained. Even if the liquefaction in the mist cutting fluid passages 5, 9c, 8k is temporarily too much, the liquefied cutting fluid is temporarily accumulated in the excavated part 8g, which is comparatively large in diameter, and the mist cutting fluid is stably flowed through the mist cutting fluid passages 5, 9c, 8f and the passage hole 11a. Besides, the rotational influence of the excavated part 8g to the mist cutting fluid flowed from the front end part 8h of the mist cutting fluid passages 5, 9c, 8f is restricted, and the mist cutting fluid flowed into the closed space 12 can be prevented from liquefying therein. Therefore, the mist cutting fluid in the closed space 12 can effectively flow to the atmosphere through the passage hole 11a. Besides, the front end part 8h of the mist cutting fluid passages 5, 9c, 8f can restrict the mist cutting fluid flowing therefrom and much cutting fluid accumulated in the excavated part 12 in circularity along the inside periphery thereof from being mixed and stirred. Accordingly, the mist cutting fluid in the closed space 12 can effectively flow to the atmosphere through the passage hole 11a.

Moreover, even if the longitudinal position of the shaft-like tool 11 is changed, the above-mentioned effects can be gained, and besides, the cutting fluid can be actively led to the passage hole 11a.

Furthermore, since the exhaust passages 8k, 8e are superior in symmetry with respect to the center of rotation of the tool holder, the rotational stability of the tool holder at the time when it is rotated in high speed is satisfactorily secured, and besides, the cutting fluid can be actively led to the passage hole 11a.

Besides, the mist cutting fluid can be applied on the tool without waste.

Moreover, the mist cutting fluid in the closed space 12 can be flowed from the exhaust passages 8k, 8e to the atmosphere only when it is required, thereby preventing waste of the mist cutting fluid.

Furthermore, a structure for automatically flowing the mist cutting fluid in the closed space 12 to the atmosphere through the exhaust passages 8k, 8e only when it is required can be made compact without damaging the rotational stability of the tool holder.

The invention claimed is:

1. A tool holder of a machine tool, comprising:
    a holder body;
    a tool receiving surface part for receiving a rear end face of a shaft-like tool so as to form an internal space bounded on one side by the rear end face, said shaft-like tool being fixed on a front end of the holder body and having one or more passages for leading mist cutting fluid from the internal space to a front end face of the shaft-like tool; and
    mist cutting fluid passages for leading mist cutting fluid fed from a front end part of a spindle to the internal space;
    wherein an exhaust passage is formed for opening the internal space to the atmosphere, said exhaust passage being in addition to said one or more passages of the shaft-like tool in communication with the space, the internal space being closed on the side bounded by the rear end face of the shaft-like tool except for said one or more passages of the shaft-like tool.

2. A tool holder of a machine tool as claimed in claim 1, wherein said exhaust passage has a circular portion near a center of rotation of the internal space, concentrically outside the mist cutting fluid passages.

3. A tool holder of a machine tool, comprising:
    a holder body;
    a tool receiving surface part for receiving a rear end face of a shaft-like tool so as to form an internal space bounded on one side by the rear end face, said shaft-like tool being fixed on a front end of the holder body; and
    mist cutting fluid passages for leading mist cutting fluid fed from a front end part of a spindle to the internal space;
    wherein said tool receiving surface part is excavated rearward to form an excavated part large in diameter, and a front end part of said mist cutting fluid passages protrudes so as to form a circular space between a peripheral wall of said mist cutting fluid passages and the excavated part, and
    wherein an exhaust passage is formed for communicating said internal space with the atmosphere, said exhaust passage comprising a circular portion bounded by and concentrically outside the mist cutting fluid passages near a center of rotation of a rear end face of the excavated part.

4. A tool holder of a machine tool as claimed in claim 1, wherein said tool receiving surface part forms a front end face of a tool receiving member adjustable in longitudinal position in the holder body.

5. A tool holder of a machine tool as claimed in claim 3, wherein said tool receiving surface part and said excavated part are formed on a front end face of a tool receiving member adjustable in longitudinal position in the holder body, and the tool receiving member defines a double pipe structure concentric with the center of rotation of the excavated part, and
    wherein an inside of an inner tube of the double pipe structure forms a part of the mist cutting fluid passages, and a circular space between the inner tube and an outer tube of the double pipe structure opens into the excavated part to form a first portion of the exhaust passage.

6. A tool holder of a machine tool as claimed in claim 5, wherein said exhaust passage portion opens to the atmosphere through a space formed at the front end part of the holder body and through an inner space of a holder body part surrounding a rear end part of the double pipe structure and a second portion of the exhaust passage formed between the tool receiving member and the holder body.

7. A tool holder of a machine tool as claimed in claim 1, wherein an automatic switching valve is provided in the exhaust passage, and said automatic switching valve opens when air pressure in the internal space is above a fixed level.

8. A tool holder of a machine tool as claimed in claim 5, wherein a cylindrical valve for opening and shutting the exhaust passage and a spring for pressing said cylindrical valve forward are positioned on a peripheral wall part of the mist cutting fluid passages, on the tool receiving member at the rear of the double pipe structure, and
    wherein the cylindrical valve is pushed and displaced rearward against the elasticity of said spring due to the air pressure in the internal space in order to open said exhaust passage when the air pressure is above the fixed level, and conversely, the cylindrical valve is pushed and displaced forward due to the elasticity of said spring to close said exhaust passage when said air pressure is below the fixed level.

* * * * *